United States Patent [19]

Goscenski, Jr.

[11] Patent Number: 4,976,667
[45] Date of Patent: Dec. 11, 1990

[54] DIFFERENTIAL CLUTCH AND LEVER ACTUATION SYSTEM THEREFOR

[75] Inventor: Edward J. Goscenski, Jr., Battle Creek, Mich.

[73] Assignee: Eaton Corporation, Cleveland, Ohio

[21] Appl. No.: 282,716

[22] Filed: Dec. 12, 1988

Related U.S. Application Data

[63] Continuation-in-part of Ser. No. 154,395, Feb. 10, 1988.

[51] Int. Cl.$^5$ .............................................. F16H 1/44
[52] U.S. Cl. ...................... 475/86; 475/234; 475/239
[58] Field of Search ............... 74/710.5, 711; 475/233, 475/234, 237, 238, 239, 249, 250, 84, 86

[56] References Cited

U.S. PATENT DOCUMENTS

| | | | |
|---|---|---|---|
| 1,032,261 | 7/1912 | Wright et al. | 74/710.5 |
| 1,243,720 | 10/1917 | Eidson et al. | 74/710.5 |
| 1,757,069 | 5/1930 | Wyman | 74/710.5 |
| 2,778,245 | 1/1957 | Thornton | 74/711 |
| 2,991,664 | 7/1961 | Bernotas | 74/711 |
| 3,158,042 | 11/1964 | Saurer | 74/711 |
| 3,186,258 | 6/1965 | Meldola | 74/710.5 |
| 3,956,945 | 5/1976 | Eggleton et al. | 74/710.5 |
| 4,412,459 | 11/1983 | Goscenski | 74/711 |
| 4,715,248 | 12/1987 | Gant | 74/711 X |
| 4,805,486 | 2/1989 | Hagiwara et al. | 74/710.5 |
| 4,811,628 | 3/1989 | Winkman et al. | 475/86 |
| 4,838,118 | 6/1989 | Binkley | 475/86 |

FOREIGN PATENT DOCUMENTS 1207082  2/1960  France ......................... 74/710.5

Primary Examiner—Dwight Diehl
Assistant Examiner—Ryan Massey
Attorney, Agent, or Firm—L. J. Kasper

[57] ABSTRACT

A differential gear mechanism is provided of the type including a gear case (17), at least one pinion gear (21), and a pair of side gears (27 and 29). Clutch packs (43 and 45) are disposed between the side gears and the gear case and are operable, when engaged, to retard relative rotation between the gear case and the side gears. The mechanism includes a fluid pressure actuated displacement mechanism (57) which, in response to an external signal (71) transmits its output displacment into axial movement of a plurality of input members (81). The axial movemenat of the input members has an actuating travel X and an actuating force F. A pair of lever members (85) receives the axial input from the input members 81, with each lever member pivoting about a fulcrum member (91) to transmit to each of the clutches a clutch actuating movement having an actuating travel substantially less than the actuating travel X, and an actuating force substantially greater than the actuating force F.

27 Claims, 3 Drawing Sheets

DIFFERENTIAL CLUTCH AND LEVER ACTUATION SYSTEM THEREFOR

CROSS-REFERENCE TO RELATED APPLICATION

This application is a continuation-in-part of co-pending U.S. application Ser. No. 154,395, filed Feb. 10, 1988.

BACKGROUND OF THE DISCLOSURE

The present invention relates to limited slip differentials, and more particularly, to such differentials of the type having means for retarding differentiating action, and actuating means for actuating the retarding means.

Limited slip differentials of the type to which the present invention relates typically include a gear case defining a gear chamber and disposed therein a differential gear set including at least one pinion gear and a pair of bevel side gears. A clutch pack is typically disposed between each of the side gears and the adjacent surface of the gear case, such that the clutch pack is operable to retard rotation between the gear case and the side gears.

In many limited slip and/or locking differentials, some sort of actuating mechanism is provided to actuate or move the clutch pack to its engaged condition. One of the current trends in the field of vehicle traction modifiers involves the desire to be able to actuate the clutch packs in response to an external signal, rather than in response to the sensing of a predetermined speed differential as has typically been the case in the prior art.

A typical prior art limited slip differential, actuated in response to an external fluid pressure signal, is illustrated in U.S. Pat. No. 2,991,664. Although it is considered possible to produce a somewhat satisfactory limited slip differential in accordance with the teachings of the prior art, there are distinct disadvantages of the prior art design which limit its commercial desirability. In the cited prior art, the clutch pack is actuated by a pressure-actuated piston, disposed adjacent the end of the clutch pack. Therefore, it is necessary to communicate the external fluid pressure signal into the differential gear case, thus requiring rotating seals. In addition, the hydraulic pressure acting on the clutch pack is acting in opposition to the gear reaction forces which inherently occur during differentiation. The result is a need for an even greater fluid pressure, further increasing the likelihood of fluid leakage.

Another disadvantage is that most limited slip differentials would need major redesign of the gear case and associated structure in order to utilize an actuation means of the general type shown in the cited reference.

SUMMARY OF THE INVENTION

Accordingly, it is an object of the present invention to provide an improved limited slip differential of the type in which the clutch pack is actuated in response to an external signal, wherein the differential overcomes the problems associated with typical prior art differentials.

More specifically, it is an object of the present invention to provide an improved limited slip differential in which the clutch actuating means exerts an actuating force on the clutch packs, aiding the normal biasing force exerted by each of the side gears as a result of gear reaction forces.

It is another object of the present invention to provide an improved limited slip differential which achieves the above-stated objects, wherein the actuating force on the clutch packs is substantially greater than the force represented by the external signal.

The above and other objects of the present invention are accomplished by the provision of an improved differential gear mechanism of the type described above wherein the clutch means comprises at least a pair of clutching surfaces disposed to be engaged in response to axial movement of one of the side gears toward the adjacent surface of the gear case. An actuating means is included for actuating the clutch means, the actuating means comprising a fluid pressure actuated displacement mechanism operable to achieve an output displacement in response to an external fluid pressure signal. The improved differential is characterized by the actuating means including an input means operable in response to the output displacement of the displacement mechanism to provide an axial input having an actuating travel X and an actuating force F. The actuating means further includes fulcrum means, and lever means operatively associated with the fulcrum means and with the input means to transmit the axial input into clutch actuating movement of one of the side gears. The fulcrum means and the lever means are configured such that the clutch actuating movement of the one side gear has an actuating travel substantially less than the actuating travel X, and an actuating force substantially greater than the actuating force F.

DESCRIPTION OF THE PREFERRED EMBODIMENT

Figure 1:
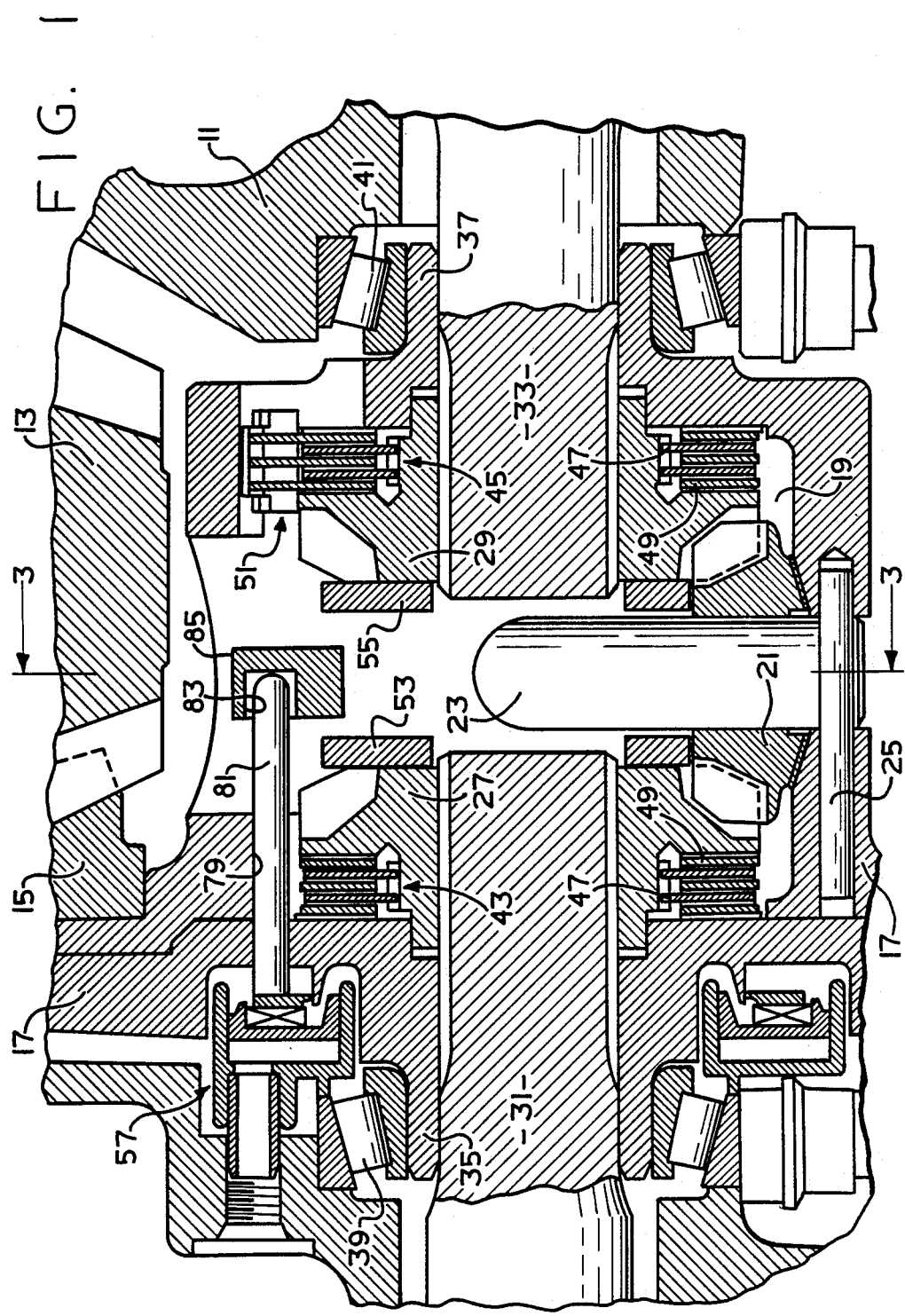
FIG. 1 is an axial cross-section of a limited slip differential of the type with which the present invention may be utilized.

Referring now to the drawings which are not intended to limit the present invention, FIG. 1 illustrates a limited slip differential of the type which may utilize the present invention. FIG. 1 illustrates a fragmentary view of a stationary, outer differential housing 11, which rotatably supports a shaft (not shown) on which is mounted an input pinion gear 13, driven by the vehicle driveline. The pinion gear 13 is in toothed, driving engagement with a ring gear 15, which is attached in any suitable manner to a differential gear case, generally designated 17.

The gear case 17 defines a gear chamber, generally designated 19, and disposed therein is a differential gear set, preferably including a plurality of planet pinion gears 21 (only one of which is shown in FIG. 1), rotatably mounted on a pinion shaft 23, which is secured to the gear case 17 by means of a pin 25.

The planet pinion gears 21 comprise the input gears of the differential gear set, and are in meshing engagement with a pair of side gears 27 and 29, which comprises the outputs of the differential gear set. The side gears 27 and 29 are splined to a pair of axle shafts 31 and 33, respectively. The gear case 17 includes a pair of annular hub portions 35 and 37 on which are mounted the inner races of bearing sets 39 and 41, respectively, which are used to provide rotational support of the gear case 17 relative to the outer differential housing 11.

During normal, straight-ahead operation of the vehicle, no differentiating action occurs between the left and right axle shafts 31 and 33, and the pinion gears 21 do not rotate relative to the pinion shaft 23 Therefore, the gear case 17, the pinions 21, the side gears 27 and 29, and the axle shafts 31 and 33 all rotate about the axis of the shaft 31 and 33, as a solid unit.

Under certain operating conditions, such as when the vehicle is turning, or a slight difference in tire size exists, it is permissible for a certain amount of differentiating action to occur between the side gears 27 and 29. However, it is desirable to be able to retard the relative rotation between the gear case 17 and the side gears 27 and 29, to prevent excessive differentiating action which, under certain operating conditions, could result in a spin-out of one of the axle shafts, and a loss of driving traction.

In order to retard differentiating action, the differential gear mechanism is provided with a retarding means for retarding differentiating action, and an actuating means for actuating the retarding means. In the subject embodiment, the retarding means comprises a clutch pack, generally designated 43, disposed between the side gear 27 and the adjacent surface of the gear case 17, and a clutch pack, generally designated 45, disposed between the side gear 29 and the adjacent surface of the gear case 17. Furthermore, in the subject embodiment, each of the clutch packs is of the multiple disc type and includes a plurality of clutch discs 47 which are splined to the side gears 27 and 29, and interdigitated therewith, a plurality of clutch discs 49 which are rotationally fixed relative to the gear case 17 by an "ear" arrangement, generally designated 51, of the type which is well known in the art.

Although the invention is being described in connection with an embodiment having a pair of clutch packs 43 and 45, those skilled in the art will understand that the invention is not so limited, and could be utilized advantageously in a differential mechanism having only a single clutch pack. Furthermore, the invention is being illustrated by means of an embodiment wherein the clutch packs are disposed between the side gears and the gear case 17, such that normal gear reaction forces, during differentiation, exert a biasing force axially "outward" (i.e., toward the gear case 17) on the clutch packs. However, the invention is not so limited, and may be used advantageously in a differential mechanism in which the clutch packs are generally operatively associated with the side gears, but are not necessarily biased toward engagement by gear reaction forces transmitted to the side gears.

Actuation of Clutch Packs

All of the structure described up to this point is well known in the art in terms of construction details and mode of operation. The present invention, which will now be described in some detail, is directed to an improved actuating means for actuating the clutch packs 43 and 45 to retard differentiating action. As was described in the background of the specification, one of the current trends in the field of vehicle traction modifiers is to be able to operate a traction modifier in the "limited slip" or "locking" mode in response to an external signal, typically, microprocessor controlled. Therefore, the present invention provides an improved differential gear mechanism wherein the clutch packs 43 and 45 can be actuated to an engaged condition in response to an external signal, which will be described herein as a fluid pressure signal, by way of example only.

Figure 3:
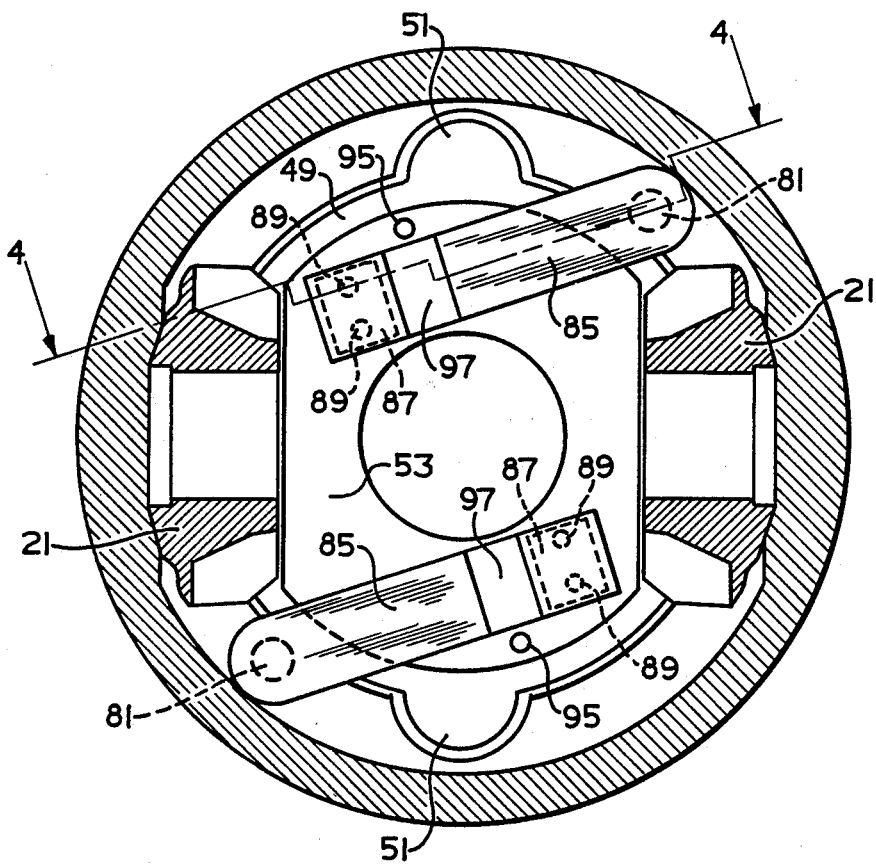
FIG. 3 is a transverse cross-section, taken on line 3-3 of FIG. 1, illustrating another part of the clutch actuating mechanism of the present invention.

Referring now to FIG. 1, in conjunction with FIG. 3, the differential of the present invention includes a load plate 53, disposed in engagement with the axially-inner face of the side gear 27, and in addition, a load plate 55, in engagement with the axially-inner face of the side gear 29. As may best be seen in FIG. 3, each of the load plates (only load plate 53 is shown in FIG. 3) has an overall shape which is annular, but with two diametrically-opposed portions removed to accommodate the pinion gears 21. In FIG. 3, the pinion shaft 23 has been removed to simplify viewing of the load plate 53.

Figure 2:
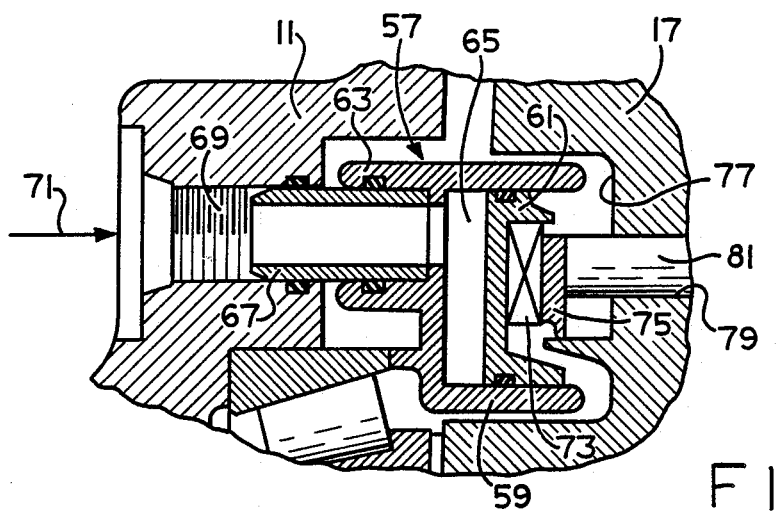
FIG. 2 is an enlarged, fragmentary cross-section, similar to FIG. 1, illustrating part of the clutch actuating mechanism of the present invention.

Referring again to FIG. 1, the differential gear mechanism includes a fluid pressure actuated displacement mechanism, generally designated 57, which is operatively associated with both the stationary outer differential housing 11, and the rotating gear case 17. Referring now primarily to FIG. 2, the mechanism 57 comprises an annular cylinder member 59, and an annular piston member 61, received within the cylinder 59, for relative axial displacement therein. It is important in utilizing the present invention that the assembly of the cylinder 59 and piston 61 is rotationally stationary, i.e., neither is permitted to rotate. The annular cylinder member 59 includes an inlet fitting portion 63 which, preferably, is formed integrally with the cylinder 59. The inlet fitting portion 63 defines a fluid passage which is in open communication with an annular chamber 65, cooperatively defined by the cylinder 59 and piston 61.

Disposed within the fitting portion 63 is a short, cylindrical fluid coupling member 67, the left end of which is received within an opening defined by the outer differential housing 11. Disposed adjacent the left end of the coupling member 67, the housing 11 defines a threaded fluid port 69, adapted for connection to an external fluid pressure signal line, illustrated schematically at 71.

Referring still to FIG. 2, in conjunction with FIG. 1, the mechanism 57 further includes an annular bearing set 73 disposed to the right of the piston 61, and an annular thrust plate 75, disposed to the right of the bearing set 73.

As noted previously the annular cylinder member 59 is rotationally stationary, i.e., it is fixed to the outer housing 11. However, in the subject embodiment, the cylinder 59 extends axially into an annular recess 77 defined by the rotating gear case 17. The gear case 17 defines a plurality of axially-extending bores 79 (only one of which is shown in each of FIGS. 1 and 2. Disposed within each of the bores 79 is a rod-like input member 81, the left end of which, in FIGS. 1 and 2, is seated against the righthand surface of the thrust plate 75. As may be seen in FIG. 3, the subject embodiment of the invention includes two of the bores 79 and input members 81.

Figure 4:
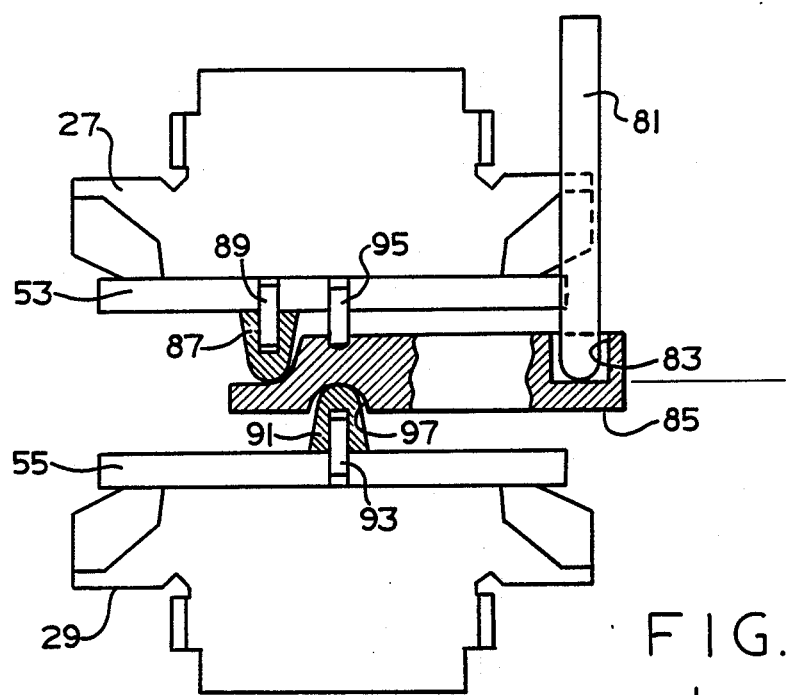
FIGS. 4 and 5 are somewhat schematic views taken generally along line 4-4 of FIG. 3, illustrating the lever and fulcrum actuating mechanism of the invention, in the disengaged and engaged positions, respectively.

Referring now primarily to FIGS. 3 and 4, in conjunction with FIG. 1, the lever and fulcrum portion of the actuating mechanism will be described. The end of the input member 81 which is opposite the displacement mechanism 57 (i.e., right end in FIG. 1) is received within an opening 83, defined by the outer end of a lever member 85. As may best be seen in FIG. 3, there are two of the lever members 85 in the subject embodiment, and only one will be described in detail, it being understood that the subsequent description applies equally to both of the members 85.

Referring now primarily to FIG. 4, there is a reaction member 87 attached, by means of a pair of pins 89 (see FIG. 3), to the load plate 53. Similarly, a fulcrum member 91 is attached, by means of a pair of pins 93 (only one of which is shown in FIG. 4), to the load plate 55. In addition, a pair of pins 95 is received within openings in the load plate 53, and are disposed radially-outwardly of the lever members 85 to limit radially-outward movement of the members 85, as a result of centrifugal force during rotation of the differential mechanism. Of course, radially-inward movement of the lever members 85 from the position shown in FIG. 3 is prevented by the presence of the pinion shaft 23.

The lever member 85 defines a recessed portion 97 (see FIG. 4), within which is disposed the fulcrum member 91. In addition, the "inner" end of the lever member 85 (left end in FIG. 4) engages the reaction member 87. In the position shown in FIG. 4, with no substantial axial input being provided by the input members 81, the lever members 85 are in what may be considered a neutral or "minimum bias" position, as will be described subsequently.

Figure 5:
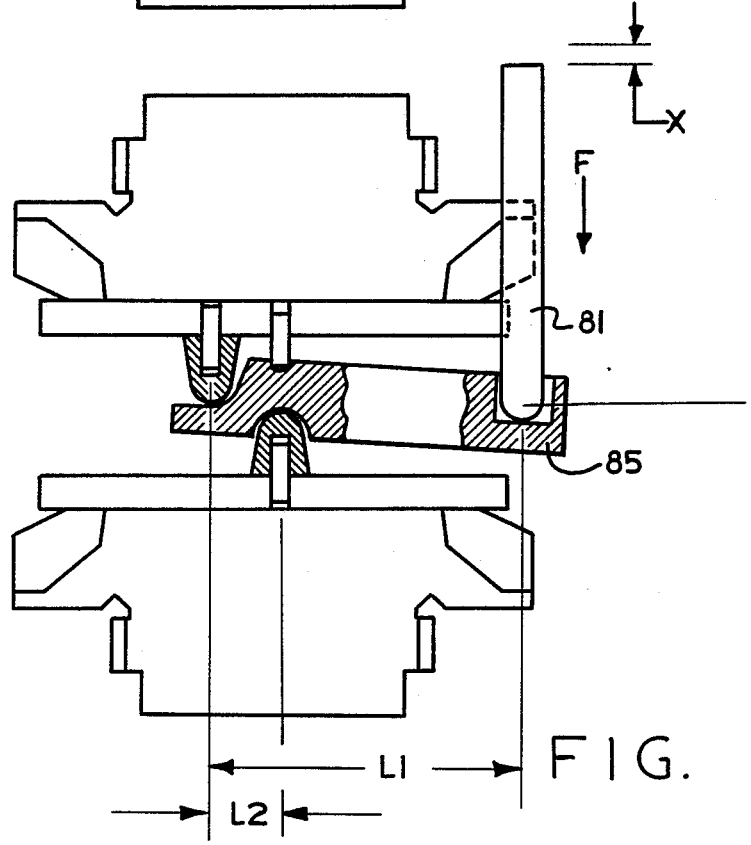

Referring now to FIG. 5, the input members 81 are now shown in a position providing an axial input to the fulcrum and lever arrangement described previously. In the position shown in FIG. 5, the outer end of the lever member 85 has been displaced axially (down in FIG. 5), with the result that the lever member 85 is pivoted about the fulcrum member 91. Typically, the distance from the fulcrum member 91 to the point of contact between the lever member 85 and the reaction member 87 would be referred to as a "lever arm". As the input member 81 moves axially, moving the outer end of the lever member 85, and causing it to pivot about the fulcrum member 91, an axial force is exerted on the reaction member 87 and on the fulcrum member 91, these axial forces comprising actuating forces which are then transmitted axially to the load plates 53 and 55, respectively, then through the side gears 27 and 29, respectively, to the clutch packs 43 and 45, respectively.

As is well known to those skilled in the art, there is a known relationship between the movement of the input member 81 and the movements of the reaction member 87 and the fulcrum member 91. This relationship is based upon the relationship between the lengths of the various lever arms involved. As may be seen in FIG. 5, the length of the lever arm from the axis of the input member 81 to the contact point of the reaction member 87 is designated "L1", while the length of the lever arm from the point of contact with the reaction member 87 to the pivot point defined by the fulcrum member 91 is designated "L2". In the subject embodiment, by way of example only, the ratio of L1 to L2 is approximately 4:1. Therefore, and still by way of example only, it will be assumed that an external fluid pressure signal is communicated into the annular chamber 65, which is sufficient to displace the piston 61 and provide an axial input, by means of the input members 81, the axial input having an actuating travel of X inches, and an actuating force of F pounds (see FIG. 5). As a result of the fulcrum and lever mechanism of the present invention, there is transmitted to each of the clutch packs 43 and 45, a clutch-actuating movement having a travel of approximately X divided by 4 inches, as an average, and an actuating force averaging approximately 4F pounds. It will be understood by those skilled in the art that the axial forces exerted by the lever member 85 on the reaction member 87 and fulcrum member 91 will be somewhat different, but for purposes of the present invention will be considered to be approximately the same. Therefore, it is one important aspect of the present invention that the actuating input from the displacement mechanism 57 may be translated into a clutch-actuating movement having substantially less travel, but a greatly multiplied actuating force.

It is another important aspect of the present invention that the preload biasing springs normally included in limited slip differentials of this type are no longer necessary, thereby saving not only the expense of the springs, but the expense and difficulty of the assembly process. With the present invention, maintenance of a relatively small "standby" pressure in the external signal line 71 can result in sufficient axial preload force on the clutch packs. An additional, related advantage of the invention is that the typical preload springs are capable of exerting only the single, predetermined preload force, whereas even the "minimum bias" or the preload which would normally be associated with a "relatively disengaged" condition of the clutch pack, can be varied, by varying the external signal 71.

Among the primary advantages associated specifically with the fulcrum and lever arrangement of the present invention is that any desired actuating force, to actuate the clutches 43 and 45, can be achieved with a much lower level of fluid pressure in the annular chamber 65, thus substantially decreasing the likelihood of fluid leakage around the coupling member 67, or past the piston member 61. Also, because of the force multiplication of the fulcrum and lever arrangement, much less axial force is transmitted from the piston 61 through the bearing set 73 and thrust plate 75 to the input members 81, thus substantially increasing the life of those components, and the overall durability of the mechanism.

The use of the present invention also makes it possible to use a lower pressure, less expensive pump to supply the external signal 71, and/or allows the use of a smaller, cylinder 59 and piston 61 in situations where space available for the cylinder and piston is limited. The use of the present invention also reduces drag at the interface of the bearing set 73, which in turn, reduces heat generation and power losses which would occur (and be four time greater in the subject embodiment) in the absence of the present invention. Finally, the use of the present invention also reduces axial reaction forces imposed on the differential housing 11 and gear case 17, which must be counteracted by the bearings 39 and 41, and the substantial reduction (75% in the subject embodiment) in the forces exerted on the mechanism 57 and input members 81 makes it possible for these components to be lighter, smaller, and less costly.

The invention has been described in great detail, sufficient to enable one skilled in the art to practice the invention. It is believed that various alterations and modifications of the invention will become apparent to those skilled in the art from a reading and understanding of the foregoing specification, and it is intended to include all such alterations and modifications as part of the invention, insofar as they come within the scope of the appended claims.

I claim:

1. A differential gear mechanism of the type including a gear case defining a gear chamber and an axis of rotation; at least one pinion gear, and a pair of bevel side gears in meshing engagement with said pinion gear; clutch means operable between a relatively disengaged condition and a relatively engaged condition, and effective to retard relative rotation between said gear case and each of said side gears, said clutch means comprising at least a pair of clutching surfaces disposed to be engaged in response to axial movement of one of said side gears toward the adjacent surface of said gear case; and actuating means for actuating said clutch means, said actuating means comprising a fluid pressure actuated displacement mechanism operable to achieve an output displacement in response to an external fluid pressure input signal, characterized by:
   (a) said actuating means including input means operable in response to said output displacement of said displacement mechanism to provide an axial input having an actuating travel X and an actuating force F;
   (b) said actuating means further including fulcrum means, and lever means operatively associated with said fulcrum means and with said input means to transmit said axial input into clutch actuating movement of said one of said side gears; and
   (c) said fulcrum means and lever means being configured such that said clutch actuating movement of said one side gear has an actuating travel substantially less than said actuating travel X, and an actuating force substantially greater than said actuating force F.

2. A differential gear mechanism as claimed in claim 1 characterized by said fluid pressure displacement mechanism comprising a cylinder and piston assembly.

3. A differential gear mechanism as claimed in claim 2 characterized by said cylinder and piston assembly being rotationally stationary, and said gear case being rotatable relative to said cylinder and piston assembly.

4. A differential gear mechanism as claimed in claim 3 characterized by said mechanism further including a stationary, outer differential housing, and a fluid pressure coupling interconnecting said outer housing and said cylinder and piston assembly, to communicate said external fluid pressure input signal to said cylinder and piston assembly.

5. A differential gear mechanism as claimed in claim 3 characterized by said input means comprising an elongated, rod-like member disposed to rotate with said gear case, and being axially movable relative thereto, and further comprising a bearing disposed between said piston and said rod-like member.

6. A differential gear mechanism as claimed in claim 1 characterized by said mechanism further comprising another clutch means operable between a relatively disengaged condition and a relatively engaged condition, and effective to retard relative rotation between said gear case and each of said side gears, said another clutch means comprising at least a pair of clutching surfaces disposed to be engaged in response to axial movement of another of said side gears toward the adjacent surface of said gear case.

7. A differential gear mechanism as claimed in claim 3 characterized by said fluid pressure actuated displacement mechanism comprising a single cylinder and piston assembly and said lever means being operable to transmit said axial input into clutch actuating movement of said other of said side gears.

8. A differential gear mechanism as claimed in claim 7 characterized by said fulcrum means and said lever means being configured such that said clutch actuating movement of said other of said side gears has an actuating travel and an actuating force approximately equal to said actuating travel and said actuating force of said one side gear.

9. A differential gear mechanism as claimed in claim 6 characterized by said fulcrum means comprising a reaction member operably associated with said one of said side gears, and a fulcrum member operably associated with said other of said side gears, and said lever means comprising an elongated lever member disposed axially between said reaction member and said fulcrum member, and in engagement therewith, said reaction member and said fulcrum member being offset from said axis of rotation, and said lever member defining a pivot point, said lever member being pivotable about said pivot point in response to said axial input.

10. A differential gear mechanism as claimed in claim 1 characterized by said fulcrum means comprising a reaction member disposed axially between said side gears and operably associated with said one of said side gears, and said lever means comprising an elongated lever member in engagement, adjacent an inner end with said reaction member, and in engagement, adjacent an outer end, with said input means.

11. A differential gear mechanism of the type including a gear case defining a gear chamber and an axis of rotation; at least one pinion gear, and a pair of bevel side gears in meshing engagement with said pinion gear; clutch means operable between a relatively disengaged condition and a relatively engaged condition, and effective to retard relative rotation between said gear case and each of said side gears; one engagement means operable to move said clutch means toward said relatively engaged condition; said clutch means comprising at least a pair of clutching surfaces disposed to be engaged in response to axial movement of said one engagement means toward said clutch means; and actuating means for actuating said one engagement means, said actuating means comprising a displacement mechanism operable to achieve an output displacement in response to an external input signal; characterized by:
   (a) said actuating means including input means operable in response to said output displacement of said displacement mechanism to provide an axial input having an actuating travel X and an actuating force F;
   (b) said actuating means further including fulcrum means, and lever means operatively associated with said fulcrum means and with said input means to transmit said axial input into said axial movement of one said engagement means; and
   (c) said fulcrum means and said lever means being configured such that said axial movement of said one engagement means has an actuating travel substantially less than said actuating travel X, and an actuating force substantially greater than said actuating force F.

12. A differential gear mechanism as claimed in claim 11 characterized by said mechanism further comprising another clutch means operable between a relatively disengaged condition and a relatively engaged condition, and effective to retard relative rotation between said gear case and each of said side gears, and further comprising another engagement means operable to move said another clutch means toward said relatively engaged condition, said another clutch means comprising at least a pair of clutching surfaces disposed to be engaged in response to axial movement of said another engagement means toward said clutch means.

13. A differential gear mechanism as claimed in claim 12 characterized by said lever means being operable to transmit said axial input into axial movement of said one engagement means and said another engagement means, simultaneously.

14. A differential gear mechanism as claimed in claim 13 characterized by said fulcrum means and said lever means being configured such that said axial movement of said another engagement means has an actuating travel and an actuating force approximately equal to said actuating travel and said actuating force of said one engagement means.

15. A differential gear mechanism as claimed in claim 12 characterized by said fulcrum means comprising a reaction member operably associated with said one of said side gears, and a fulcrum member operably associated with said other of said side gears, and said lever means comprising an elongated lever member disposed axially between said reaction member and said fulcrum member, and in engagement therewith, said reaction member and said fulcrum member being offset from said axis of said of rotation, and said lever member defining a pivot point, said lever member being pivotable about said pivot point in response to said axial input.

16. A differential gear mechanism as claimed in claim 11 characterized by said external input signal comprising a fluid pressure signal, and said displacement mechanism comprising a cylinder and a piston assembly.

17. A differential gear mechanism as claimed in claim 16 characterized by said cylinder and piston assembly being rotationally stationary, and said gear case being rotatable relative to said cylinder and piston assembly.

18. A differential gear mechanism as claimed in claim 16 characterized by said input means comprising an elongated, rod-like member disposed to rotate with said gear case, and being axially movable relative thereto, and further comprising a bearing disposed between said piston and said rod-like member.

19. A differential gear mechanism as claimed in claim 17 characterized by said mechanism further including a stationary, outer differential housing, and a fluid pressure coupling interconnecting said outer housing and said cylinder and piston assembly, to communicate said external fluid pressure input signal to said cylinder and piston assembly.

20. A differential gear mechanism as claimed in claim 11 characterized by said fulcrum means comprising a reaction member disposed axially between said side gears and operably associated with said one of said side gears, and said lever means comprising an elongated lever member in engagement, adjacent an inner end with said reaction member, and in engagement, adjacent an outer end, with said input means.

21. A differential mechanism of the type including a case defining a chamber, and first and second output members defining an axis of rotation, and at least partly disposed within said case, and rotatably supported therein for rotation about said axis of rotation; first and second clutch means operably associated with said case and with said first and second output members, respectively, and operable between a relatively disengaged condition and a relatively engaged condition, effective to retard relative rotation between said case and said first and second output members; first and second engagement means operable to move said clutch means toward said relatively engaged condition; each of said clutch means comprising at least a pair of clutching surfaces disposed to be engaged in response to axial movement of said first and second engagement means toward said first and second clutch means, respectively; and actuating means for actuating said first and second engagement means, said actuating means comprising a displacement mechanism operable to achieve an output displacement in response to an external input signal; characterized by:
  (a) said actuating means including input means operable in response to said output displacement of said displacement mechanism to provide an axial input having an actuating travel X and an actuating force F;
  (b) said actuating means further including fulcrum means and lever means operatively associated with said fulcrum means and with said input means to transmit said axial input into said axial movement of said first and second engagement means; and
  (c) said fulcrum means and said lever means being configured such that said axial movement of each of said first and second engagement means has an actuating travel substantially less than said actuating travel X, and an actuating force substantially greater than said actuating force F.

22. A differential mechanism as claimed in claim 21 characterized by said external input signal comprising a fluid pressure signal, and said displacement mechanism comprising a cylinder and piston assembly.

23. A differential mechanism as claimed in claim 22 characterized by said cylinder and piston assembly being rotationally stationary, and said case being rotatable relative to said cylinder and piston assembly.

24. A differential mechanism as claimed in claim 23 characterized by said mechanism further including a stationary, outer housing, and a fluid pressure coupling interconnecting said outer housing and said cylinder and piston assembly, to communicate said external fluid pressure input signal to said cylinder and piston assembly.

25. A differential mechanism as claimed in claim 23 characterized by said input means comprising an elongated, rod-like member disposed to rotate with said case and being axially movable relative thereto, and further comprising a bearing disposed between said piston and said rod-like member.

26. A differential mechanism as claimed in claim 21 characterized by said fulcrum means comprising a reaction member operably associated with said first engagement means, and a fulcrum member operably associated with said second engagement means, and said lever means comprising an elongated lever member disposed axially between said reaction member and said fulcrum member, and in engagement therewith, said reaction member and said fulcrum member being offset from said axis of rotation, and said lever member defining a pivot point, and being pivotable about said pivot point in response to said axial input.

27. A differential mechanism of the type including a case defining a chamber, and first and second output members defining an axis of rotation, and at least partly disposed within said case, and rotatably supported therein for rotation about said axis of rotation; clutch means operably associated with said case and with said first output member, and operable between a relatively disengaged condition and a relatively engaged condition, effective to retard relative rotation between said case and said first output member; engagement means operable to move said clutch means toward said relatively engaged condition; said clutch means comprising at least a pair of clutching surfaces disposed to be engaged in response to axial movement of said engagement means toward said clutch means; and actuating means for actuating said engagement means, said actuating means comprising a displacement mechanism operable to achieve an output displacement in response to an external input signal; characterized by:

(a) said actuating means including input means operable in response to said output displacement of said displacement mechanism to provide an axial input having an actuating travel X and an actuating force F;

(b) said actuating means further including fulcrum means and lever means operatively associated with said fulcrum means and with said input means to transmit said axial input into said axial movement of said engagement means; and (c) said fulcrum means and said lever means being configured such that said axial movement of said engagement means has an actuating travel substantially less than said actuating travel X, and an actuating force substantially greater than said actuating force F.